June 18, 1957 C. N. McCARTHY 2,795,969
FINAL DRIVE MEANS
Filed Jan. 19, 1955 5 Sheets-Sheet 2

INVENTOR
Charles N. McCarthy
BY
L. D. Burch
ATTORNEY

June 18, 1957

C. N. McCARTHY 2,795,969

FINAL DRIVE MEANS

Filed Jan. 19, 1955

INVENTOR
Charles N. McCarthy
BY
L. D. Burch
ATTORNEY

United States Patent Office 2,795,969
Patented June 18, 1957

2,795,969

FINAL DRIVE MEANS

Charles N. McCarthy, Royal Oak, Mich., assignor to General Motors Corporation, Detroit, Mich., a corporation of Delaware Application January 19, 1955, Serial No. 482,805

6 Claims. (Cl. 74—710)

This invention relates to final drive means in general and more particularly to drive means for transmitting drive forces to vehicle wheels supported by independently sprung axles.

Independently sprung or half axles are well-known in the prior art. So also is the advisability of disposing the universal joints connecting half axle drive shafts with the final drive means as close as possible to the vehicle center line to reduce drive angularity by increasing the axle swing radius. Reducing drive angularity is advisable with universal joint drives since they are incapable of transmitting power at constant velocity when operating at excessive angles. A further desirable feature in driving independently sprung vehicle axle shafts is that the shafts be differentially driven; that is, that one shaft be able to rotate faster than the other. This allows greater ease in cornering a vehicle since the outer road wheels have a greater distance to travel and must be rotated faster. The differential drive means, however, may not be disposed between the half axles without reducing or obstructing the center line area within which the universal joints are most advantageously disposed.

It is now proposed to provide a final drive assembly which includes a differential drive unit having universal pots adapted for use as differential side gears for driving independently sprung vehicle axle shafts. The pot-type side gears are formed with external gear surfaces which mesh with planetary gears mounted within a differential cage. The differential cage is secured to the differential ring gear which is driven by the drive pinion. The proposed arrangement permits differential drive of the vehicle half axles without obstructing the vehicle center line area within the differential housing and thereby permits the use of longer axle shafts which in turn increases the axle swing radius and reduces drive angularity.

A further feature of the present invention is the provision of drive shaft braking means for more effective braking of the final drive means, particularly as adapted for vehicle use. This type of braking means is commonly referred to as a parking brake. Such braking means have been used with the propeller drive shaft immediately behind the transmission unit and on the axle shafts on opposite sides of the differential housing. Because of the disposition of the propeller drive shaft under the vehicle body where space is at a premium, it is not practical to interpose braking means within the drive means.

The proposed braking means is disposed on the after end of the differential unit opposite the propeller drive shaft and is connected to the drive shaft through the differential unit. Such disposition of the brake means provides less obstruction since the differential unit itself occupies considerable space and the brake means may be compactly arranged within the space available. The braking means is connected to the drive shaft within the drive pinion head and is thereby also adapted to act through the drive pinion on the differential ring gear and differential cage. The use of hypoid drive gearing and a novel differential gear cage permits the brake connection to the drive shaft through the differential housing without disturbing the operation of the final drive means.

Figure 1:
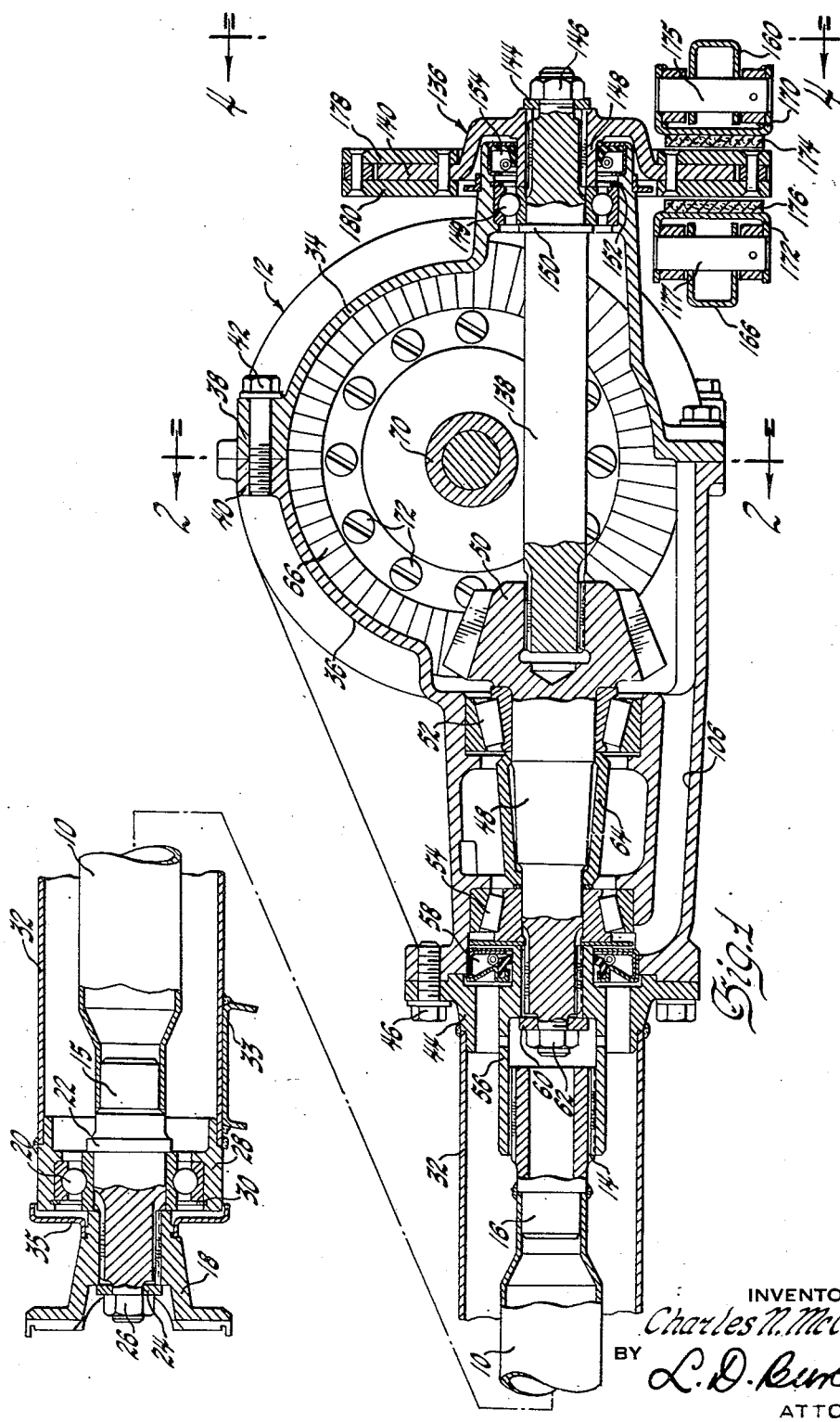
Figure 1 is a cross-sectioned side elevational view of the proposed final drive means including the proposed final drive braking means.
Figure 2:
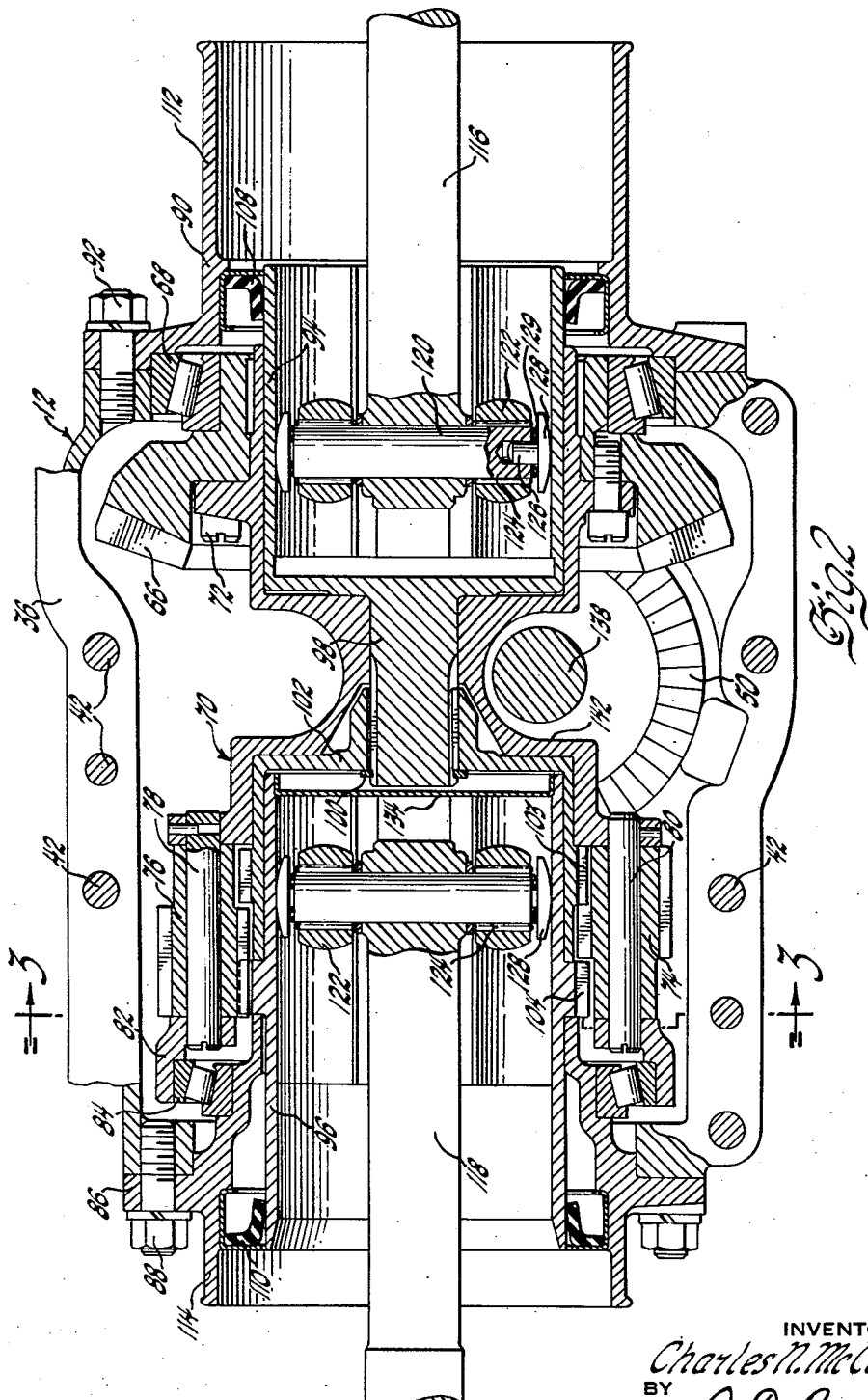
Figure 2 is a cross-setional view of the proposed drive means taken in the plane of line 2—2 of Figure 1, looking in the direction of the arrows thereon.

The proposed final drive means include a propeller drive shaft 10 connected between an engine (not shown) and a differential drive unit 12. The drive shaft 10 is tubular and has splined end connections 15 and 16 secured in opposite ends thereof. A yoke member 18 is spline connected to the end connection 15 and bears against the inner race of a ball bearing member 20 disposed about the end connection and bearing against a shoulder formed by a collar 22 of the end connection. A washer 24 and threaded nut 26 are secured to the end connection for holding the yoke 18 and bearing member 20 in place. A sleeve member 28 is secured to the outer race of the ball bearing member 20 by a snap ring 30. A tubular drive shaft housing 32 is secured to the sleeve member 28 and extends the length of the drive shaft 10. The tubular housing 32 is secured to the vehicle frame or other member by a bracket 33. A cupped shield member 35 is secured to the yoke 18 and disposed about the end of the ball bearing 20 and sleeve 28 to protect the ball bearing member from foreign matter.

The differential drive unit 12 comprises a casing formed by two members 34 and 36 flanged as at 38 and 40 and secured together by fastening means 42. A flanged sleeve member 44, having the end of the drive shaft housing 32 secured thereto, is secured to the casing member 36 by fastening means 46. A stub shaft 48 including a drive pinion 50 formed at one end thereof is mounted within the end of the casing member 36 within tapered roller bearings 52 and 54. The tapered roller bearings are disposed to take axial thrusts received by the drive pinion stub shaft in opposite directions. An internally splined sleeve member 56 is spline connected to the end connection 16 of the drive shaft and to the end of the drive pinion shaft 48. An oil seal 58 is disposed about the sleeve member 56 within the end of the casing member 36. A washer 60 and threaded nut 62 are secured to the end of the drive pinion stub shaft 48 for retaining the sleeve member 56, tapered roller bearings 52 and 54 and bearing spacer member 64 upon the stub shaft.

The drive pinion 50 is a bevel gear mating with a beveled ring gear 66 mounted for rotation within the casing member 36 within a tapered roller bearing 68. The axes of the drive pinion 50 and ring gear 66 are non-intersecting and non-parallel axes providing hypoid drive gearing.

A differential drive gear cage or housing member 70 is secured to the ring gear 66 by fastening means 72 and is disposed concentric with the ring gear. The differential gear cage 70 is a planetary gear cage having pairs of differential drive gears 74 and 76 mounted therein and rotatable about gear pins 78 and 80 secured to the cage member. The ends of the pins 78 and 80 are connected to cage support members 82 which are received by a tapered roller bearing 84. A bearing retainer end plate 86 is secured to the side of the differential casing 12 by fastening means 88. Another bearing retainer end plate 90 is secured to the other side of the differential casing 12 by fastening means 92. The ring member 66 and differential gear cage 70 are thereby rotatably mounted within the differential casing 12 upon tapered roller bearings 68 and 84.

Universal joint drive means or pots 94 and 96 are rotatably disposed within the differential casing 12 concentric with the differential gear cage 70 and axially aligned with each other. The one pot 94 includes a splined stub end 98 which has spline connected thereto, and retained thereon by a snap ring 100, a cupped member 102 receiving the other pot 96 and having an external gear surface 103 formed thereon and disposed for mating relation with one gear, 74, of each pair of differential drive gears. The other pot 96 includes an external gear surface 104 disposed for mating relation with the other gear, 76, for each pair of differential drive gears. The differential drive gears 74 and 76 are disposed to mate with the aforementioned gear surfaces 103 and 104 and with each other.

Figure 3:
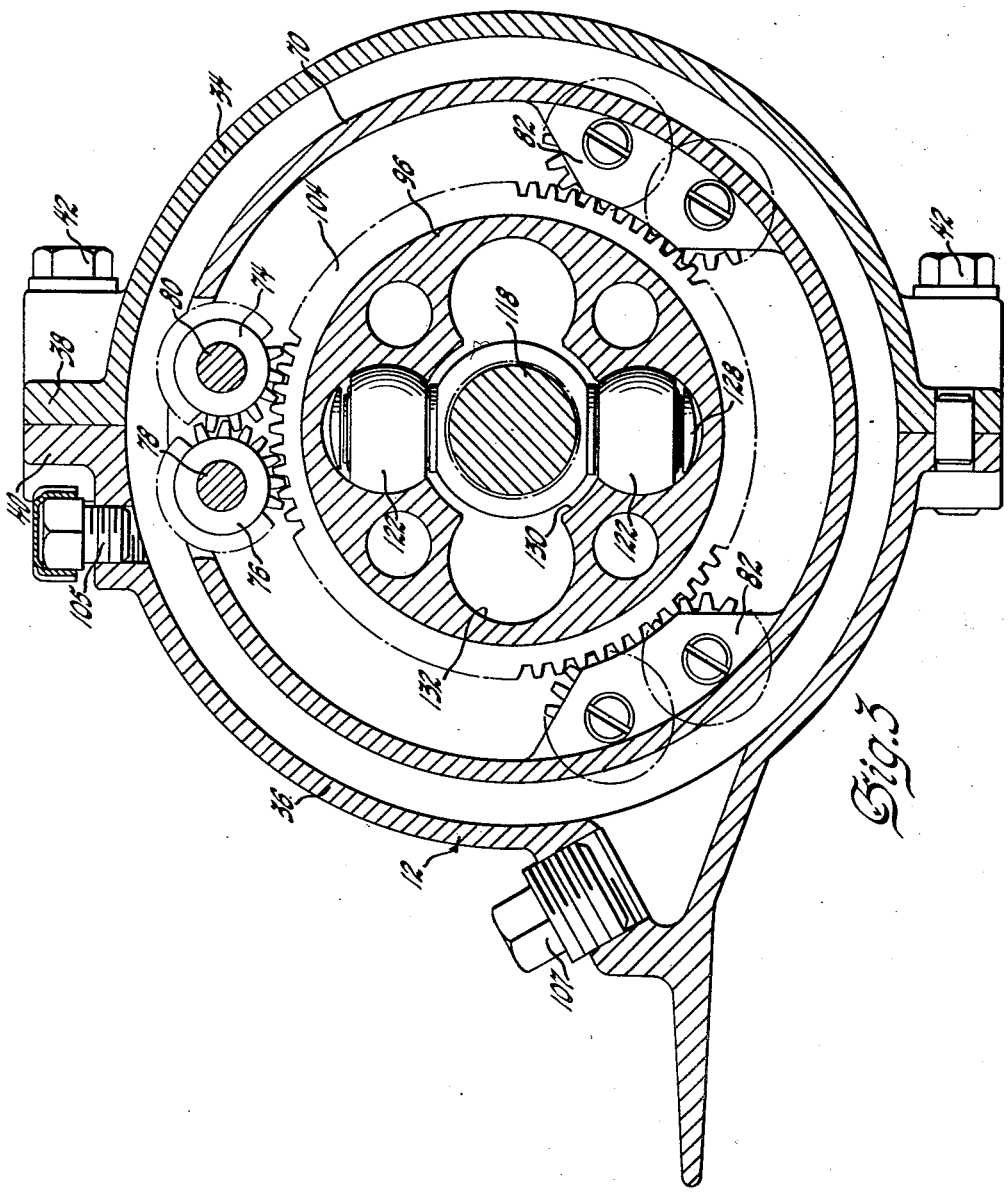
Figure 3 is a cross-sectional view of the differential gearing of the final drive means as taken in the plane of line 3—3 of Figure 2, looking in the direction of the arrows thereon.
Figure 4:
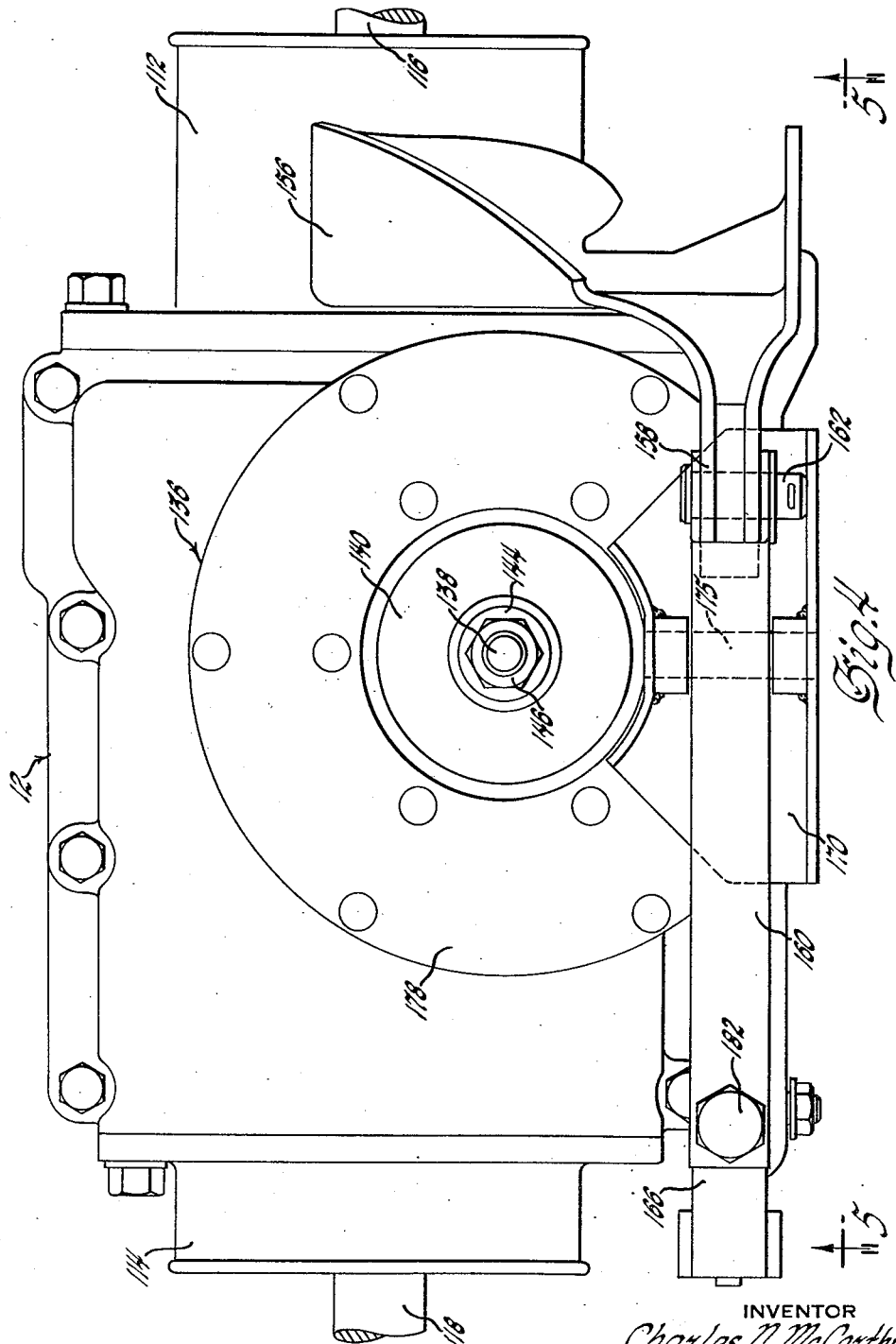
Figure 4 is an end view of the final drive means as taken in the plane of line 4—4 of Figure 1, looking in the direction of the arrows thereon.
Figure 5:
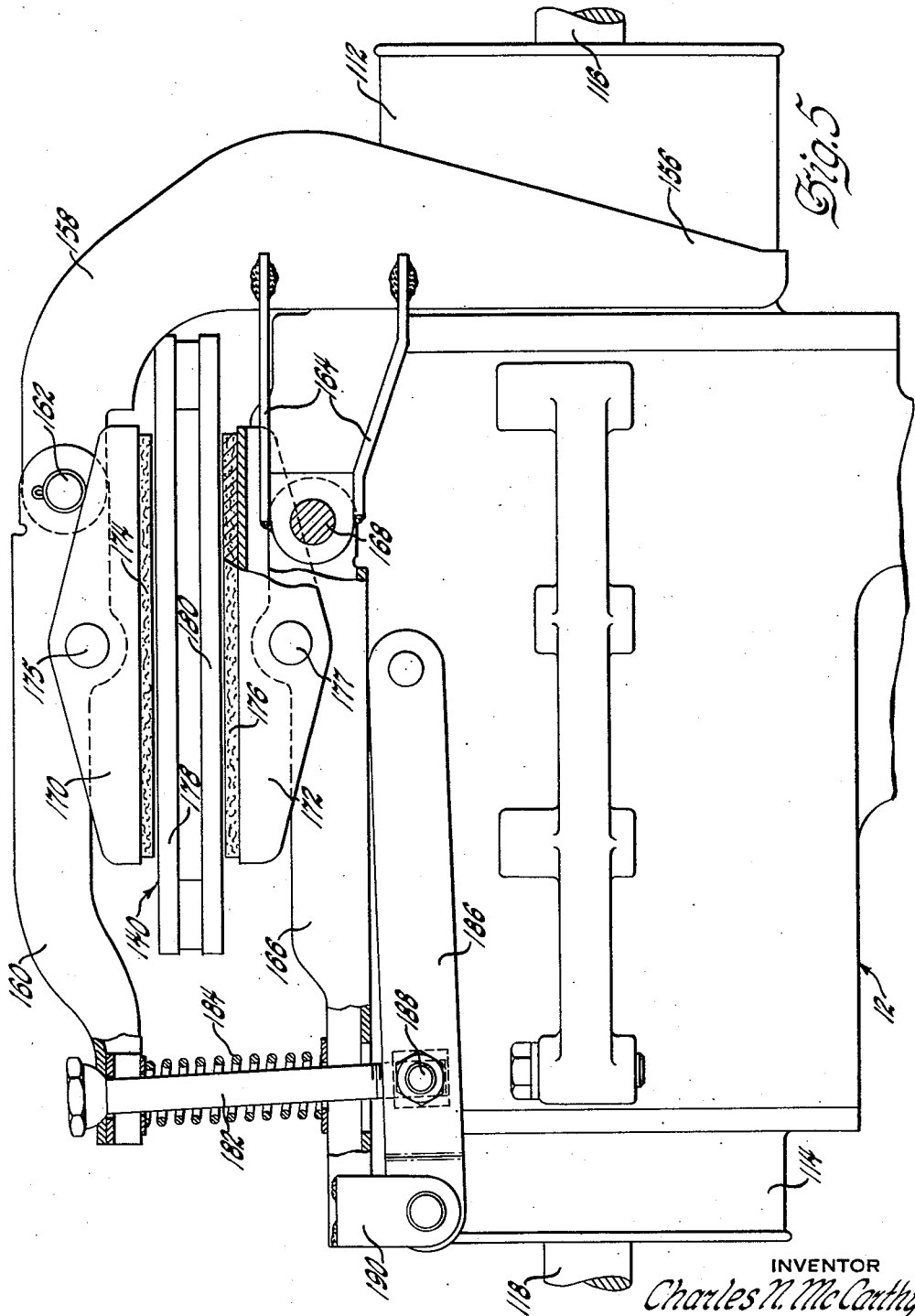
Figure 5 is a bottom view of the final drive means showing more detail of the braking means and as taken in the plane of line 5—5 of Figure 4, looking in the direction of the arrows thereon.

The differential drive unit 12 is adapted to have a lubricant disposed therein for lubricating the various bearing members and mating gear faces. Access plugs 105 and 107 are provided as shown in Figure 3. A passage 106 is formed through the casing member 36 to provide lubricant access to the tapered roller bearings 52 and 54 supporting the drive pinion stub shaft 48. Oil seals 108 and 110 are disposed between the outer forward ends of the pots 94 and 96 and the radially flanged portions 112 and 114 of the bearing retainer end plates 90 and 86 to prevent leakage of the differential lubricant from the differential casing.

Extending inwardly through opposite sides of the differential casing 12 and within the universal pots 94 and 96 are a pair of half or swing axles 116 and 118 which are suitably connected at their outer ends to vehicle drive wheels not here shown. The axles 116 and 118 are formed at their inner ends to receive rotatable wrist pins 120 transversely therethrough. Sleeve-like semispherical ring members 122 are received upon the extended ends of the pins 120. The ring members include roller bearings 124. The ends of the wrist pins 120 are formed to receive the stems 126 of button members 128 secured to the ends of the pins with conical spring washers 129 disposed therebetween. The semispherical rings 122 and button members 128 provide a sphere-like knob on the ends of the wrist pins.

The universal pots 94 and 96 include a central bore 130 formed therethrough for receiving the half axles 116 and 118 and four circumferentially spaced bores 132 which conform generally with the configuration of the spherical knobs provided on the ends of the axle shaft members. The spherical knobs of each axle shaft are received within opposite circumferential bores 132 of its respective pot. A disc 134 is disposed within the end of pot 96 to prevent axle shaft engagement with stub end 98. The use of the universal pot-type driving joint provides drive engagement with the axle shafts 116 and 118 near the center line of the vehicle allowing a longer length for the axle shafts and consequently less drive angularity despite the deflection of the vehicle wheels and the resultant angular relation of the axle shafts to the driving universal pots.

Referring now to Figure 3, the differential drive means are shown to include the differential gear cage 70 with three equally spaced pairs of differential gears 74 and 76 mounted thereon and the universal pots 94 and 96, each of which are concentrically and rotatably disposed within the differential drive casing 12. Inasmuch as the gear surface 103 of the cupped sleeve member 102 driving the one universal pot 94 is disposed directly behind the gear surface 104 formed about the universal pot 96 shown, the one differential gear 74 appears to mate with the gear surface 104 of the universal pot 96. However, it actually mates with the gear surface 103 of the sleeve member 102 which is not shown in Figure 3. The drive pinion 50 is rotated by the propeller drive shaft 10 and in turn rotates the ring gear 66 and the differential gear cage 70 secured thereto. The differential drive gears 74 and 76 which are secured to the differential gear cage 70 are caused to planetate about the universal drive pot 96. If the resistance to drive applied to both vehicle wheels is equal the differential gears 74 and 76 which mesh together, will be locked and will thereby drive the universal pots 94 and 96 in the course of their planetation therearound. This provides a direct drive. If there should be less resistance to the drive of one vehicle wheel, as in turning a corner or with one wheel slipping, one of the differential drive gears will be permitted to rotate and the other of the gears will be driven proportionately faster thereby providing the required differential drive essential for vehicle use.

Brake means 136 are secured to the after end of the differential drive unit 12. The brake means 136 include a rotatable shaft 138 journalled within a ball bearing member 140 provided in the end of casing member 34 and spline connected within the head of the drive pinion 50. The shaft 138 extends through the differential unit 12 and is splined at its other end to receive a brake disc 140. The differential gear cage 70 is formed to provide an annular groove 142 within its outer periphery about its axis of rotation by means of which the shaft 138 may be extended through the differential drive unit 12 without interference with the differential gear cage 70. A washer 144 and threaded nut 146 are received upon the end of the shaft 138 to engage the brake disc collar 148 against the bearing member 149 and the bearing against a collar 150 formed about the shaft. A snap ring 152 holds the bearing member 149 in place. An oil seal 154 is disposed between the brake disc collar 148 and casing member 34 to protect the bearing member.

A webbed support bracket 156 is secured to the differential drive unit 12 and formed to provide a support arm 158 extended behind the drive unit. A lever arm 160 is pivotally connected to the end of the support arm 158 as by a pivot pin 162. Other support means 164 secured to the differential drive unit 12 has another lever arm 166 pivotally secured thereto as by a pivot pin 168. The lever arms 160 and 166 are disposed in spaced relation and on opposite sides of the brake disc 140. Brake shoes 170 and 172 including friction facings 174 and 176 are pivotally secured to the lever arms 160 and 166, respectively, as at 175 and 177 and are disposed to engage the annular brake members 178 and 180 of the brake disc 140. The lever arms 160 and 166 are held apart to dispose the brake shoes 170 and 172 in spaced relation to the brake disc 140 by a tie bolt 182 extended through the ends of the lever arms and having a spring member 184 disposed thereon. The tie bolt 182 is pivotally secured to a control arm 186 as at 188, which is itself pivotally connected to a yoke member 190 secured to the one lever arm 166.

Movement of the control arm 186 pulls the lever arms 160 and 166 together against the action of the spring member 184 and causes the friction facings 174 and 176 of the brake shoes 170 and 172 to engage the brake disc 140. The braking thus applied is directly to the drive pinion 50 through the spline brake shaft 138 connected within the head thereof. The disposition of the brake means 136 affords a locking up of the differential drive gears 74 and 76 to provide drive wheel braking near the drive wheels and yet in a position which does not interfere with the vehicle drive shaft 10 or the vehicle drive axles 116 and 118.

I claim:

1. Final drive means for driving independently sprung half axles and which includes, a driven member, a differential gear cage connected to said driven member, universal joint drive means adjacently disposed and concentrically arranged within said differential gear cage, differential drive gears mounted upon said gear cage and circumferentially engaged with said universal joint drive means, and separate axle shafts engaged within said universal joint drive means for receiving the drive forces differentially transmitted through said differential drive gears to said universal joint drive means.

2. Differential drive means including a drive member having a planetary gear cage connected thereto, pairs of differential drive gear members mounted upon said gear cage, universal joint drive means disposed concentrically within said gear cage, gear surfaces carried by said universal joint drive means, one gear member of each of said pairs of gear members meshing with the gear surface of one of said universal joint drive means and the other gear member of each of said pairs of gear members meshing with the gear surface of other of said universal joint drive means, each of said gear members of each of said pairs of gear members also meshing together, and drive shafts connected to said universal joint drive means for receiving the drive forces differentially transmitted through said differential drive gear members.

3. Final drive means including a driven shaft, differential drive means connected to said driven shaft for driving independent axle shafts, brake means disposed opposite said driven shaft from said differential drive means, and means connecting said brake means to said driven shaft independent of said differential drive means, said brake means being operable to brake said driven shaft and said differential drive means connected thereto.

4. Final drive means including a driven shaft, a hypoid differential drive unit connected to said driven shaft, brake means disposed opposite said driven shaft from said differential drive unit, and means for connecting said brake means to said driven shaft independent of said differential drive unit which includes; a differential gear cage, an annular recess formed peripherally about said gear cage, and a rotatable shaft connected to said driven shaft and disposed within said annular recess in spaced relation to said gear cage, said shaft having an engageable brake disc secured to the end thereof.

5. Final drive means including a driven member, differential drive means connected to said driven member, universal joint drive members axially aligned and concentrically disposed within said differential drive means, means connecting said universal joint drive members to said differential drive means, and brake means connected to said driven member, said brake means and said driven member being disposed on opposite sides of said differential drive means and said universal joint drive members and being connected together independently of said drive means and drive members.

6. Final drive means including a drive shaft, a driven member connected to said drive shaft, said drive shaft and said driven member having non-parallel and non-intersecting axes, a differential gear cage connected to said driven member, universal joint drive means adjacently disposed and axially aligned concentrically within said differential gear cage, differential drive gears mounted upon said gear cage, means connecting said differential drive gears with different of said universal joint drive means, brake means disposed on the side of said differential gear cage opposite said drive shaft, and means connecting said brake means to said drive shaft independent of said differential gear cage, said differential gear cage including an annular recess formed from the periphery thereof to provide access for said brake connecting means therethrough.

References Cited in the file of this patent

UNITED STATES PATENTS

| | | |
|---|---|---|
| 1,300,359 | Duer | Apr. 15, 1919 |
| 1,644,707 | Blackmore | Oct. 11, 1927 |
| 2,102,973 | Porsche | Dec. 21, 1937 |
| 2,123,005 | Ford | July 5, 1938 |
| 2,187,843 | Rzeppa | Jan. 23, 1940 |